United States Patent [19]

Jones et al.

[11] 4,425,505

[45] Jan. 10, 1984

[54] DUAL HEAD MEASURING TECHNIQUES FOR RADIATION GAGING OF REINFORCING BAR

[75] Inventors: Duane T. Jones, Coopersburg; Nikolai Eberhardt, Bethlehem, both of Pa.

[73] Assignee: Bethlehem Steel Corporation, Bethlehem, Pa.

[21] Appl. No.: 254,556

[22] Filed: Apr. 15, 1981

[51] Int. Cl.³ ...................... G01N 23/00; G01B 11/04
[52] U.S. Cl. ................................ 250/359.1; 356/385;
378/55; 378/59
[58] Field of Search .............. 250/358.1, 359.1, 360.1,
250/363 R, 366, 368, 390, 391, 392; 378/54, 55,
58, 59; 356/384, 385, 432, 435

[56] References Cited

U.S. PATENT DOCUMENTS

| | | |
|---|---|---|
| 3,715,592 | 2/1973 | Busch et al. ........................... 378/55 |
| 3,832,550 | 4/1974 | Bartlett et al. |
| 3,835,323 | 9/1974 | Kahil ..................................... 378/59 |
| 3,864,573 | 7/1975 | Hoffman et al. |
| 3,868,510 | 2/1975 | Murata et al. ......................... 378/55 |
| 4,057,725 | 4/1977 | Wagner |
| 4,170,417 | 10/1979 | Tourres ............................... 356/385 |

Primary Examiner—Janice A. Howell
Attorney, Agent, or Firm—John I. Iverson; John J. Selko

[57] ABSTRACT

A continuously measuring on-line production gage calibrated to indicate bar weight per foot and unaffected by typical reinforcing bar shape variability utilizes two radiation gages with their measuring axes separated by 90 degrees and offset by 45 degrees from the rib plane of the reinforcing bar. Each gage is equipped with a shutter which may be adjusted electrically to simulate any required weight per foot standard and with the gage zeroing on a predetermined shutter setting, the shutter automatically opens and radiation detector signal variations from the zero point are amplified, linearized, averaged, and scaled electronically to produce a percent weight per foot output signal. Summation of detected radiation is also performed through use of optical fibers.

7 Claims, 11 Drawing Figures

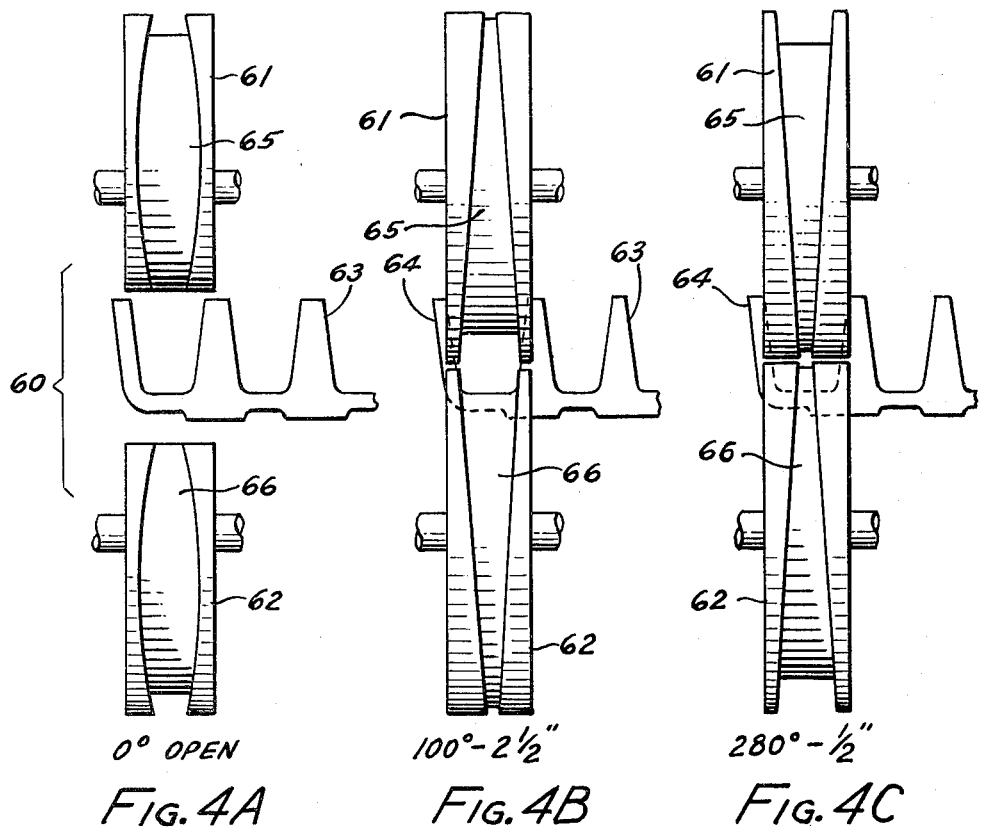
0° OPEN
FIG. 4A
100°-2½"
FIG. 4B
280°-½"
FIG. 4C
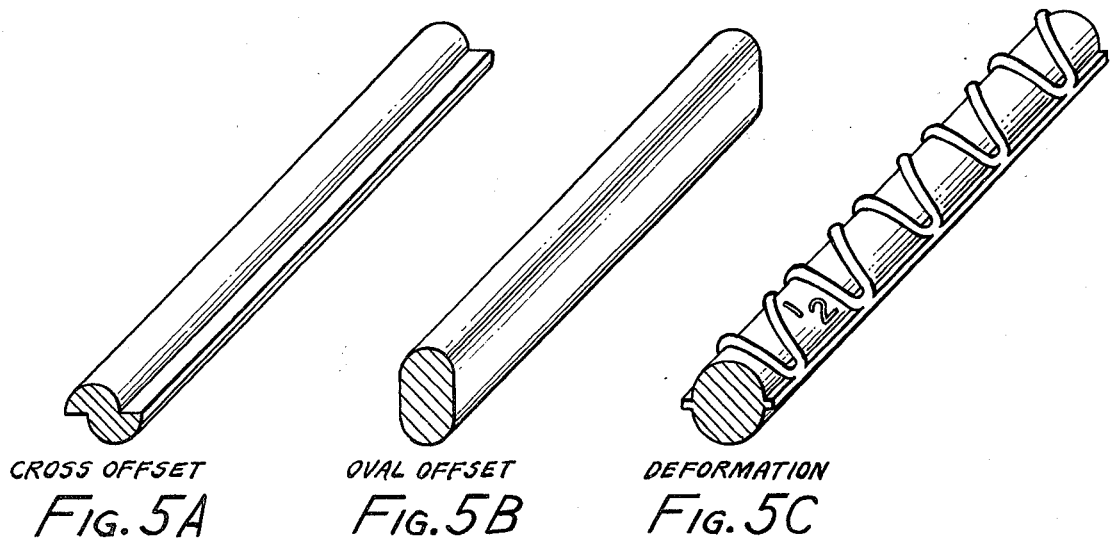
CROSS OFFSET
FIG. 5A
OVAL OFFSET
FIG. 5B
DEFORMATION
FIG. 5C

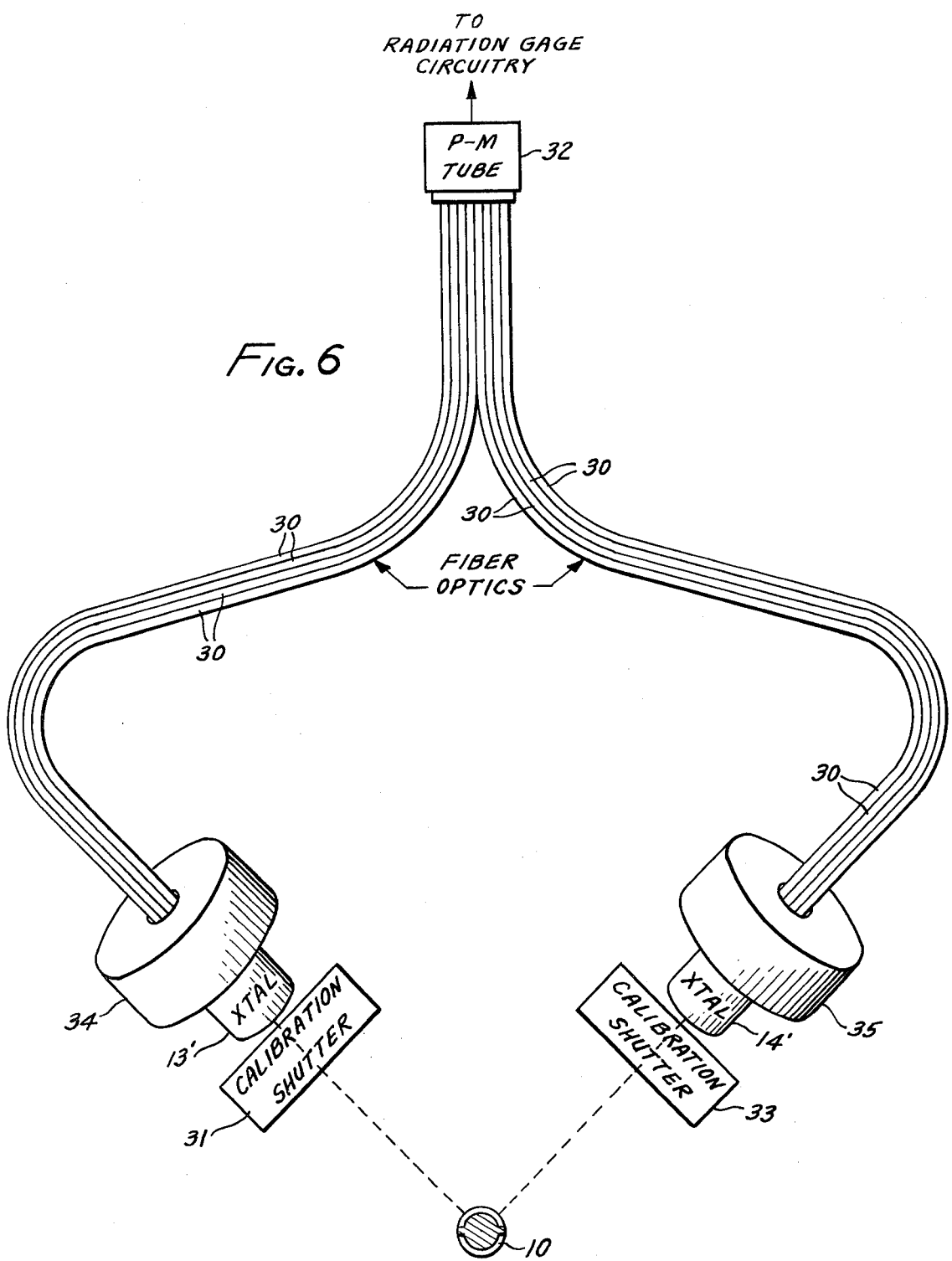

DUAL HEAD MEASURING TECHNIQUES FOR RADIATION GAGING OF REINFORCING BAR

BACKGROUND OF THE INVENTION

The present invention relates to gaging apparatus for determining deviation of a material property from a nominal value in the range of values and more particularly to an improved structure and arrangement of radiation gage equipment for measuring the weight per unit length of reinforcing bar where the reinforcing bar material is moving past the gage equipment. The weight per unit length measurement is a function of bar dimension, shape and composition and a high energy radiation gage measurement is used to provide a single composite signal accounting for all of these measuring parameters. The principle of radiation absorption in a material upon which this is based, stated simply, is that the intensity of a beam of radiation, as it passes through a material, decreases exponentially as a function of density, thickness and linear absorption factor for the material. Also, weight may be described as a function of density and thickness. Therefore, weight information will be contained in a radiation beam, after passing through a sample varying in shape and density.

Gages in this equipment may be adjusted to read thickness and density besides weight per unit length and other such allied uses.

Such radiation gage equipment has been described in prior art patents such as U.S. Pat. No. 3,832,550 wherein is discussed the use of a single range radiation gage having a source of radiation and a scintillation type of radiation detector operating in an interruptable, self-balancing measuring loop. In the present invention the equipment of the prior art patent has been added to and modified in order to greatly increase the accuracy of measurement over that of the equipment found in the patent and what is presently known and commercially available.

U.S. Pat. No. 3,864,573 also describes a radiation gage utilizing a scintillation detector with a source of nuclear radiation and with a self-balancing measuring loop useful for the purposes of the present invention and also containing some elements of the present invention. But again it will be noted that differences of the structure of the present invention have enabled a more accurate measurement with ancillary benefits.

Most notably the present invention provides a means to gage the weight per foot of reinforcing bar which is greatly simplified over prior art such as described in U.S. Pat. No. 4,057,725, which requires the use of a scanning multiplicity of radiation sources and detectors.

Reinforcing bar is sold on a theoretical weight per foot basis where ASTM standards of weight tolerance permit rolling the product 6.0% lighter than the theoretical weight per foot of a given bar size. Mill performance is limited by present gaging and control techniques wherein weight per foot is based on manual weighing of one foot samples cut from production at specified time intervals. When operated in this manner it is possible that undesirable weight per foot fluctuations could occur on a bar to bar basis and therefore this practice, when a one foot section is manually weighed every fifteen minutes, permits rolling the product an average of only 2.8% light with a two sigma variation of ±2.56% for all sizes.

In order to consistently roll reinforcing bar closer to the 6% specification tolerance, a means as in the present invention to continuously measure weight per foot as it exits the finishing stand is required. The prior art does not disclose such a continuously measuring reinforcing bar weight per foot gage structured as in the present invention.

SUMMARY OF THE INVENTION

It is an object of the present invention to provide improved gaging apparatus which will permit the manufacture of reinforcing bars of known and possibly guaranteed head to tail end weight per foot, thus with zero rejects.

It is another object to use the outputs of the apparatus to set mill parameters and thereby consistently roll reinforcing bar to lower aim weight per foot thereby increasing mill yields and sales revenues at lower additional cost.

It is a further object to reduce production costs by adjusting billet provisioning based on gage produced records of actual weight per foot.

Very basically it is the object of the present invention to build gages which give readings truly independent of the shape of the bar, even, for example, to the measure of the weight of I beams.

Therefore it is an object of the present invention to reduce errors due to an unround shape of the bars by use of a combination of gages applied along different angles and otherwise overcome errors introduced by shape variability.

Basically, to compensate for shape errors the present invention includes the use of two gages at 90 degrees to each other and with one tilted to about +45 degrees from the vertical and the other one tilted to about −45 degrees from the vertical and interconnected so that their outputs are added and averaged.

The present invention comprises noncontacting radiation gages each utilizing a source of radiation and radiation detectors. Changes in detector signals, produced by reinforcing bars of unknown weight per foot passing through the radiation measuring field, are processed electronically to provide the gage operation with an output calibrated to percent deviation from theoretical bar weight per foot. The sources and detectors are mounted with their measuring axes 90 degrees apart to reduce, to tolerable levels, gaging errors normally produced by typical reinforcing bar shape offsets. The measuring circuits operate automatically over a range of bar sizes, requiring only a single manual bar size reference input.

Therefore it is an object to develop equipment of the radiation gage type for measuring which will permit continuous automatic on-line weight per foot measurement of reinforcing bar in a range of sizes including sizes of bars number 4 to number 11 with a two sigma measuring accuracy of ±1.0%.

BRIEF DESCRIPTION OF THE DRAWINGS

The above and other objects and advantages of the invention will become apparent upon full consideration of the following detailed description and accompanying drawings in which:

FIGS. 4A through 4C illustrate a vernier bar guide used with the gage of the present invention;

FIGS. 5A through 5C illustrate some samples of bar shapes encountered during operation of the present invention;

FIG. 6 is a partial diagrammatic illustration of an alternative means for summation of detector measurements using fiber optics.

DESCRIPTION OF THE PREFERRED EMBODIMENTS

Figure 1:
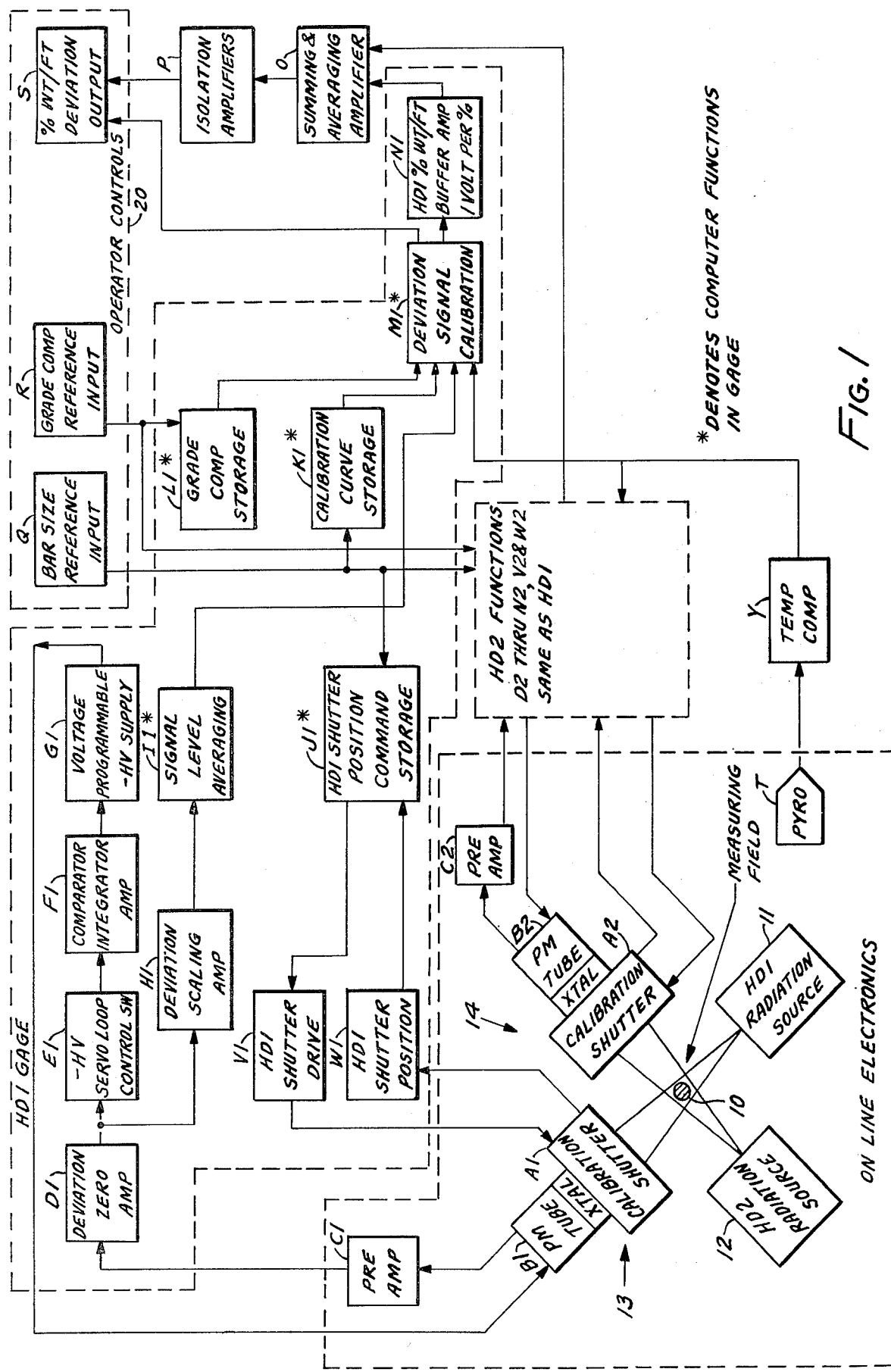
FIG. 1 is a block diagram of the measuring circuit for the weight per foot radiation gage of the present invention for use with reinforcing bar or other material being measured for its weight per foot.

Referring first to FIG. 1 there is shown a block diagram of the elements comprising the circuitry of the reinforcing bar measuring equipment.

Figure 2:
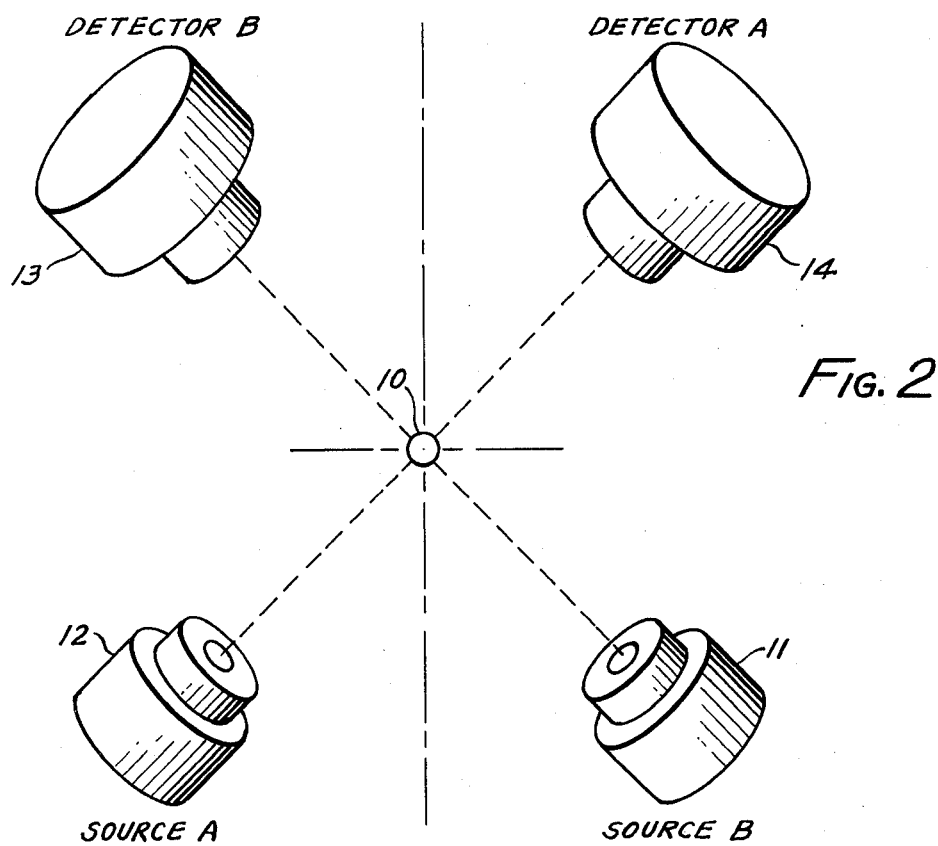
FIG. 2 is a diagrammatic view of the positioning of radiation sources and detectors relative to a reinforcing bar.
Figure 3:
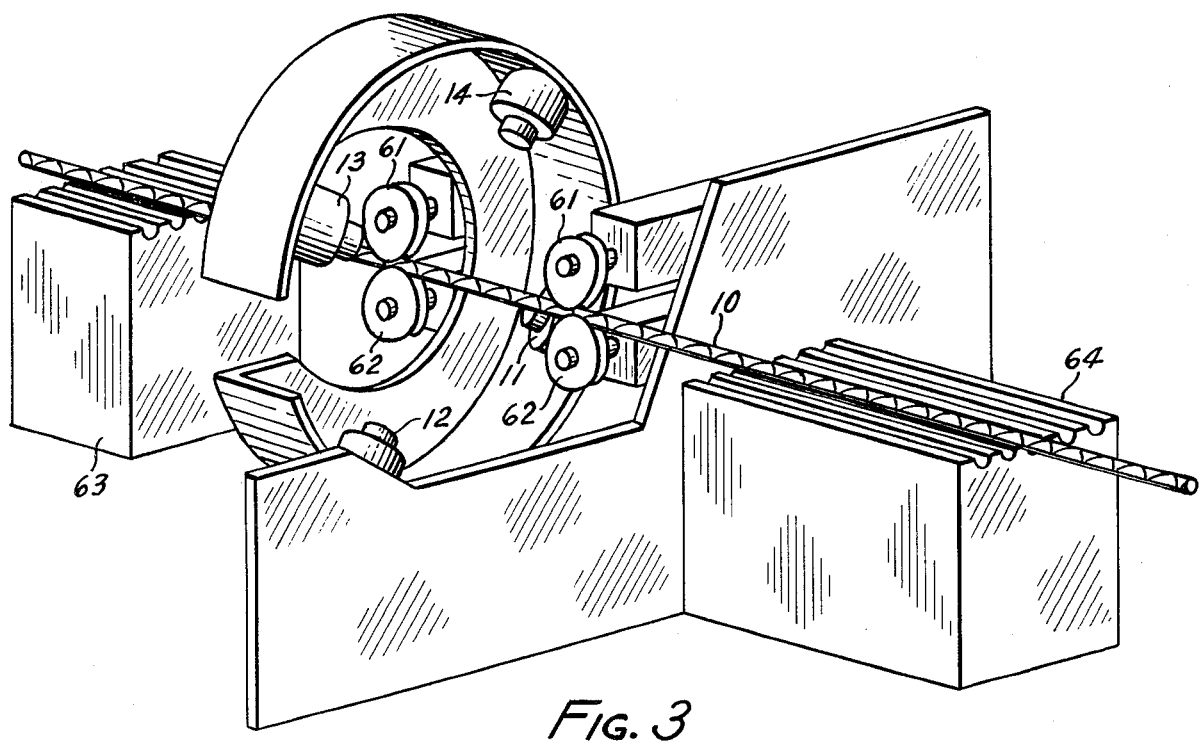
FIG. 3 is a perspective drawing of the supporting carriage for the detectors and means to guide the reinforcing bar past the detectors.

Two isotope radiation sources 11 and 12 are used with companion detectors 13 and 14 with the placement of the source-detector axes in planes perpendicular to each other and passing through the longitudinal axis or rib plane of the reinforcing bar 10. Gaging accuracy is optimized when the measuring axes are offset by 45 degrees from the rib plane of the reinforcing bar. This relationship of reinforcing bar 10, shown in section with the bar perpendicular to the surface of the drawing sheet, to sources 11 and 12 and companion detectors 13 and 14 respectively, is illustrated in FIGS. 2 and 3.

Radiation sources 11 and 12 may be 10 curie cesium 137 sources or may be of any wavelength and intensity level capable of penetrating, with detectable intensity, steel thicknesses to 1.50 inches. The radiation detectors 13 and 14 may be of any type and configuration capable of detecting such energy levels and intensities. As rolled product 10 of unknown weight per unit length enters the measuring field covered by detectors 13 and 14, a vernier bar guide illustrated in perspective view of FIG. 3 and in more detail in FIGS. 4A though 4C guides and constrains the bar 10 to the measuring field and adjusts itself to accommodate to a range of bar sizes including sizes in the range from #4 through #11. Numerical designations for bar size used by the steel industry are coded to designate the number of ⅛" diameter increments of a perfectly round standard bar which has the same theoretical weight as the finished reinforcing bar. Errors are incurred as a result of the non-linear detector sensitivity, non-uniform radiation beam geometry and to a lesser extent, Compton scattering off the bar. By linearizing the detector sensitivity to the bar motion with a shaped radiation beam absorber fixed in front of the detector these errors can be materially reduced. Measuring errors produced by bar motion are reduced to acceptable levels by mechanically restricting the bar to the center or to a small portion of the radiation fields. It has been determined in connection with the present equipment that errors which are a function of bar position within the radiation field can be reduced to tolerable levels by restricting the center axis of the bar to within approximately 0.10 inch of the center of the measuring field, measured perpendicular to the source-detector axis. The variable opening guide 60 satisfies this positioning requirement. Guide 60 includes two pairs of grooved wheels 61,62 with the inner diameter and width of the grooves of each being tapered. As wheels 61 and 62 are rotated in tandem, the guide opening 65,66 of each wheel 61,62 respectively as viewed along the bar pass line is decreased as noted in the change from FIG. 4B to FIG. 4C. Portions of guide wheels 61 and 62 have been removed to produce a large gap between the wheels of the set at zero rotation as illustrated in FIG. 4A. The gap allows on-off line movement of the gage carriage without interfering with production. In production use, guide rotation settings will be programmed to allow a rotation which provides an opening with a diameter approximately 0.10 inch larger than the nominal diameter of the bar being gaged. The guides are activated after the head-end of the bar has passed the carriage.

In practice, accuracy of the measured radiation intensity is adversely affected by bar shape. Besides bars of elliptical cross section other deviations from the round occur. FIG. 5A illustrates a shape due to a sidewise shift of the upper roll relative to the lower roll. This results in a cross section where the upper and lower semicircles (or semiellipses) are offset. This shape deviation is termed cross rolling error. Another significant deviation from the round is seen in FIG. 5B, the oval shape results from too large a roll gap. Another deviation considered is shown in FIG. 5C and consists of circumferential protrusions and excess volume being squeezed sidewise into the space between rolls. The protrusions are designed to give the bar a better adhesion to the surrounding concrete. It can be shown mathematically, using equations which describe the composite intensity of radiation passing around and through the bar 10 placed in the measuring field of FIG. 1, that outputs from the two detectors 13 and 14 are compensatory in nature and when summed act to decrease the adverse effect on measuring accuracy of the bar shapes illustrated in these figures, the present invention therefore utilizes the two radiation gages with measuring axes located as in the present invention.

Figure 7:
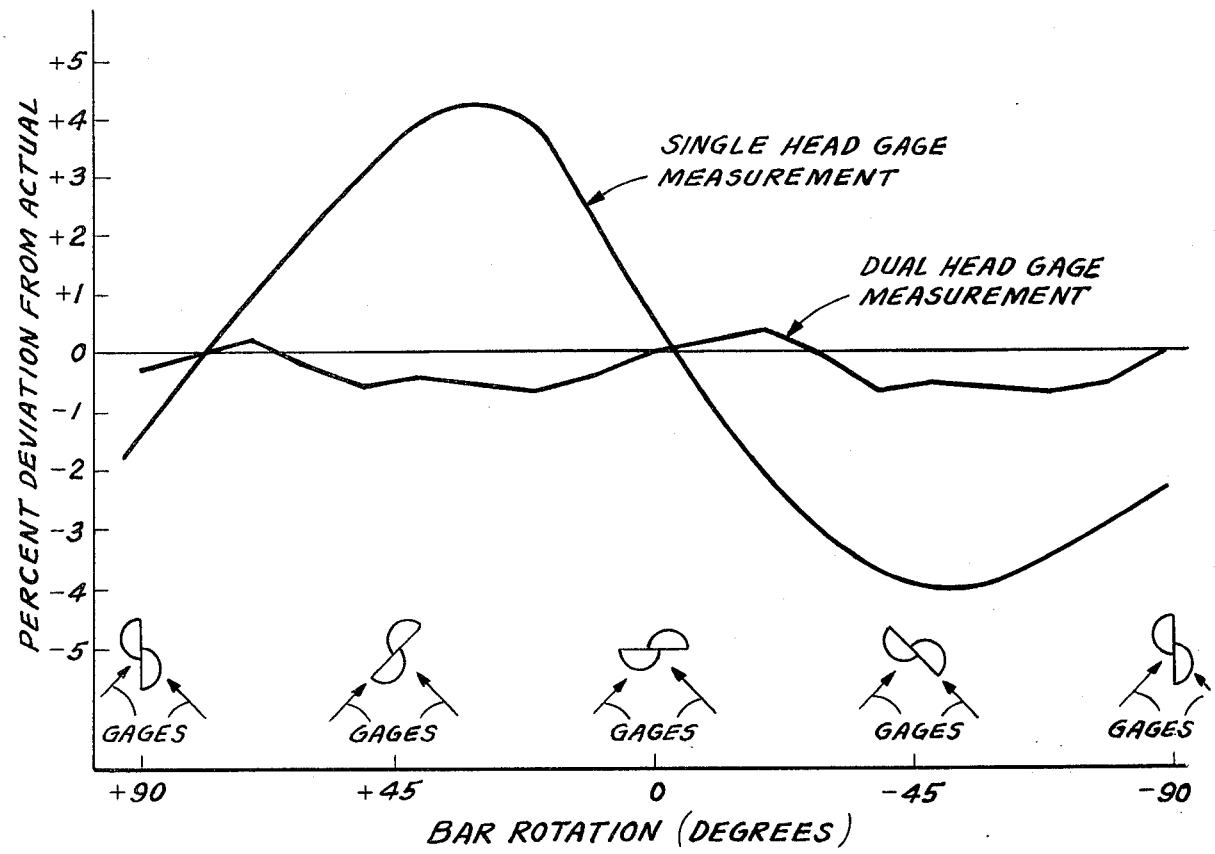
FIG. 7 is a plot of bar rotation versus percent deviation from a single head gage measurement and a dual head gage measurement.

FIG. 7 shows a plot of bar rotation in degrees versus percent deviation in bar weight per foot from the actual bar weight per foot for a single head gage measurement and the dual head gage measurement of this invention. It can be seen from FIG. 7 that the single head gage measurement yielded an error of ±4% while the dual head gage measurement of this invention yielded an error of only ±0.6%.

As indicated in FIG. 1, the equipment consists of an on-line electronics section with two gages HD1 and HD2 and each of these connected to separate HD1 gage circuitry and HD2 gage circuitry. Since these portions of the circuitry are identical, only the HD1 gage circuitry is shown in full with a single block indicating similar HD2 gage circuitry. In addition there are shown operator controls 20 and a few units (O,P,T,Y) which are used in common as single units connected to both gage circuits.

Referring again to FIG. 1, the radiation from guided bar 10 passes through both mechanical shutters A1 and A2, both of which may be adjusted electrically to simulate any weight per foot or any other material standard. This feature eliminates any need to use calibration standard bars for placement in the measuring field of the gage during the production use of the gage equipment.

During initial calibration of the equipment or after major mechanical or electrical component changes, standard round bars of known weight per foot are inserted into the measuring field and standard bar equivalent shutter settings are determined by manually positioning the shutters A1, A2 to produce the same detector output obtained with the calibration bar. Shutter measuring position settings are also determined which limits the width of the radiation beams reaching the detectors A1, A2 to an arbitrary fixed amount larger than the calibration standard bars. Shutter position data is generated and stored in the shutter position command storage units J1 and J2 through shutter position units W1 and W2 respectively.

In production operation, calibration factors are automatically computed for each bar size change input by the operator. Calibration curves are then stored in calibration curve storage units K1, K2. The calibration curve scaling slope and offset values are calculated from three radiation detector levels measured with the calibration shutter driven to settings which represent three calibration bars of known weight per foot. Linear regression calculations are used to generate the calibration slopes and offsets which is a statistical method for finding a straight line that best fits the set of data points. Calibration errors caused by shutter positioning are therefore minimized by the error averaging qualities of this method. This computer data is then available for equipment settings with a range of bar sizes.

Upon initiation of the measuring procedure, in order to eliminate electronic drift, source decay and extraneous absorption offset effects, the gage equipment zeros on a shutter setting which simulates a calibration bar with no weight per foot deviation from the theoretical. Zeroing is effected by activating the high voltage electronic servo loop for each gage HD1 and HD2, including for the HD1 gage, photomultiplier tube B1, preamplifier C1, deviation zero amplified D1, high voltage servo loop control switch E1, time integral generator F1, and voltage programmable high voltage supply G1. The high voltage on photomultiplier tube B1 is thereby regulated in accordance with a time integral signal to alter tube gain and maintain anode current constant even though the radiation source may decay or the photomultiplier tube gain characteristic may drift. At the same time and in the same manner equivalent elements of the HD2 gage are activated and the high voltage on photomultiplier tube B2 is similarly regulated.

As a rolled product such as the reinforcing bar of unknown weight per foot enters the measuring field, the high voltage electronic servo loops B1-G1 and B2-G2 are deactivated and calibration shutters A1 and A2 are opened to their measuring positions under automatic control. This automatic control takes place in each gage by commands from shutter position command storage units J1,J2 which have shutter measuring position information from a previously discussed setting up calibration procedure at which time information was generated and stored for each bar size to be gaged by the equipment. Shutter position command storage units J1,J2 activate shutter drive units V1,V2 which operate respective calibration shutters A1,A2.

Any variations of weight per foot in the rolled product from a predetermined theoretical value will produce radiation detector output signal variations about the zero calibration current point. The deviation signal obtained from the scintillation counters comprising photomultiplier tubes B1,B2 and their associated crystal scintillating material, and passing through preamplifiers C1,C2, and deviation from zero amplifiers D1,D2 respectively in each of the gages, is scaled in deviation scaling amplifiers H1,H2, filtered in signal level averaging units I1,I2, and calibrated to a volts per percent deviation in deviation signal calibration units M1,M2 and buffer amplifiers N1,N2. In the deviation signal calibration units M1,M2 compensation for grade and temperature of the reinforcing bar takes place. At the console of operator controls 20 the operator indicates the grade of the product through grade compensation reference input unit R which activates grade compensation storage units L1,L2 to feed the grade information to the respective deviation signal calibration unit M1 or M2. Temperature compensation information is received by respective deviation signal calibration units M1 and M2 from single units which feed both gage units. A pyrometer T in the grouping of on-line electronics feeds temperature information to temperature compensation unit Y which sends the information to the respective deviation signal calibration units M1,M2. Deviation signal calibration units M1,M2 receive calibration curve information from respective calibration curve storage units K1,K2 which have been activated for the proper bar size measurements by the operator from bar size reference input unit Q from operator controls 20, which input from unit Q has also been sent to the respective shutter position command storage units J1,J2 which through shutter drives V1,V2 have opened calibration shutters A1,A2 for the size bar being measured.

With reference again to FIG. 2, the manner of the present invention of compensating for the errors caused by the shapes of bars as those illustrated in FIGS. 5A-5C is through the use of two gages 13 and 14. One of the gages is tilted to about +45 degrees from the vertical and the other to about -45 degrees from the vertical relative to the first mentioned gage. The gages are interconnected in such a manner that their outputs are added and averaged. In this way the mean values of the readings of both is determined.

Such summing of outputs takes place in the present illustrated circuitry of FIG. 1 in summing and averaging amplifier O, passing through isolation amplifiers P to show a reading on the panel of operator controls 20 in the precent weight per foot deviation output unit S. Deviation output unit S includes an analog deviation meter as well as one in digital form suitable for future input to a mill computer.

An alternative method of accomplishing the results of the equipment of FIGS. 1, 2 and 3 is shown in partial diagrammatic form in FIG. 6. Instead of the use of two gages with duplicate units in a portion of the circuitry, only duplicate scintillator 13' and 14' with calibration shutters 31 and 33 which limit the radiation as previously described could be connected with fiber optic supports 34 and 35 through fiber optics 30 to but a single photomultiplier tube 32 which would be connected with only a single set of units instead of a second set of separate units with a second photomultiplier tube as in FIG. 1. FIG. 6 is only a partial showing and therefore appropriate sources for optical transmission would be used but are not shown. Also the summing circuitry of FIG. 1 would be eliminated since the summing would be in the optical domain at photomultiplier tube 32.

In the use of the above invention it is within the realm of the invention to alter the detector signal processing electronics to produce calibrated outputs of actual bar weight per foot as well as deviation from theoretical weight per foot.

It will be obvious to those skilled in the art that various changes may be made without departing from the scope of the invention and the invention is not to be considered limited to what is shown in the drawings and described in the specification.

We claim:

1. A system for measuring weight per unit length of rod product which system converts radiation into a light source that varies as a function of a material property comprising
   a first detection gage detecting radiation along an axis through the rod being measured,
   a second detection gage detecting radiation along a second axis through the rod being measured, with said axes of said first and second detection gages substantially perpendicular to each other,
   means to restrict the center axis of the rod product to within approximately 0.10 inch of the center of a radiation field produced by the first and second detection gages; and
   means to sum and average the outputs of first and second detection gages.

2. The material measuring system of claim 1, further characterized by
   said axis of said first detection gage tilted approximately 45 degrees in one direction from the vertical, and
   said axis of said second detection gage tilted approximately 45 degrees in the opposite direction from the vertical from said axis of said first detection gage.

3. The material measuring system of claim 1, further characterized by
   each of said detection gages having an associated radiation source located diametrically opposite said detection gage forming a pair of perpendicular source to gage axes rotated approximately 45 degrees from the vertical.

4. The material measuring system of claim 1, further characterized by
   a calibration shutter associated with each of said detection gages,
   gage circuitry connected to each of said detection gages each including
      means to zero on a shutter setting indicative of a predetermined size of the material to be measured, and
      means to open said shutter to its measuring position.

5. The material measuring system of claim 4, further characterized by
   said means to zero on a shutter setting including a high voltage electronic servo loop means to simulate a calibration standard of material of the type being measured having no weight per unit length deviation from a theoretical value for a particular predetermined size.

6. The material measuring system of claim 5, further characterized by
   said high voltage electronic servo loop means including
      a photomultiplier tube,
      a deviation from zero amplifier connected to said photomultiplier tube,
      a comparator, a time integral generator connected to said deviation from zero amplifier,
      and a voltage programmable high voltage supply connected to said comparator integrator amplifier,
      said amplifiers and said voltage supply regulating the gain of said photomultiplier tube in accordance with an integrated error signal.

7. The material measuring system of claim 6, further characterized by
   said gage circuitry also including
      a deviation scaling amplifier connected to said deviation from zero amplifier for scaling a signal received from said deviation from zero amplifier,
      a signal level averaging filtering means connected to said deviation scaling amplifier,
      and calibrating means to calibrate a signal from said filtering means to a weight per unit length deviation,
   summing and averaging amplifier means connected to said calibrating means of each said gage circuitry.

* * * * *